Aug. 23, 1955  H. W. MULCAHY  2,715,967
COMBINED FRICTION AND RUBBER SHOCK ABSORBING
MECHANISMS FOR RAILWAY DRAFT RIGGINGS
Filed Aug. 8, 1952  2 Sheets-Sheet 1
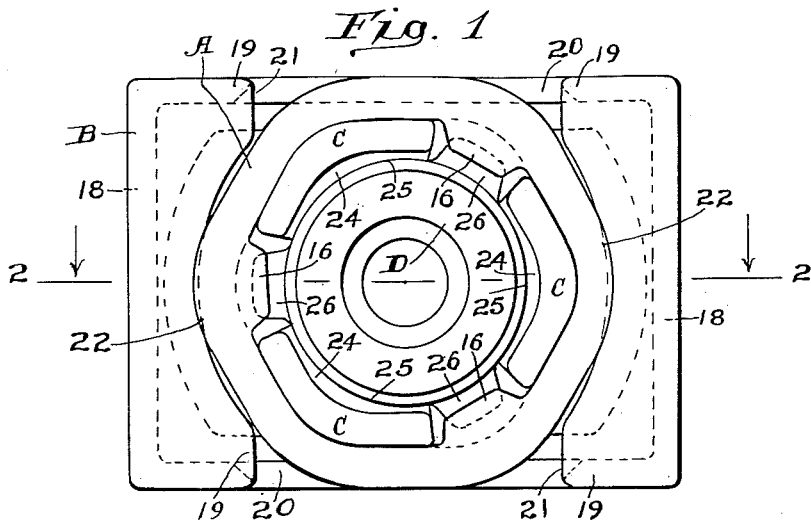
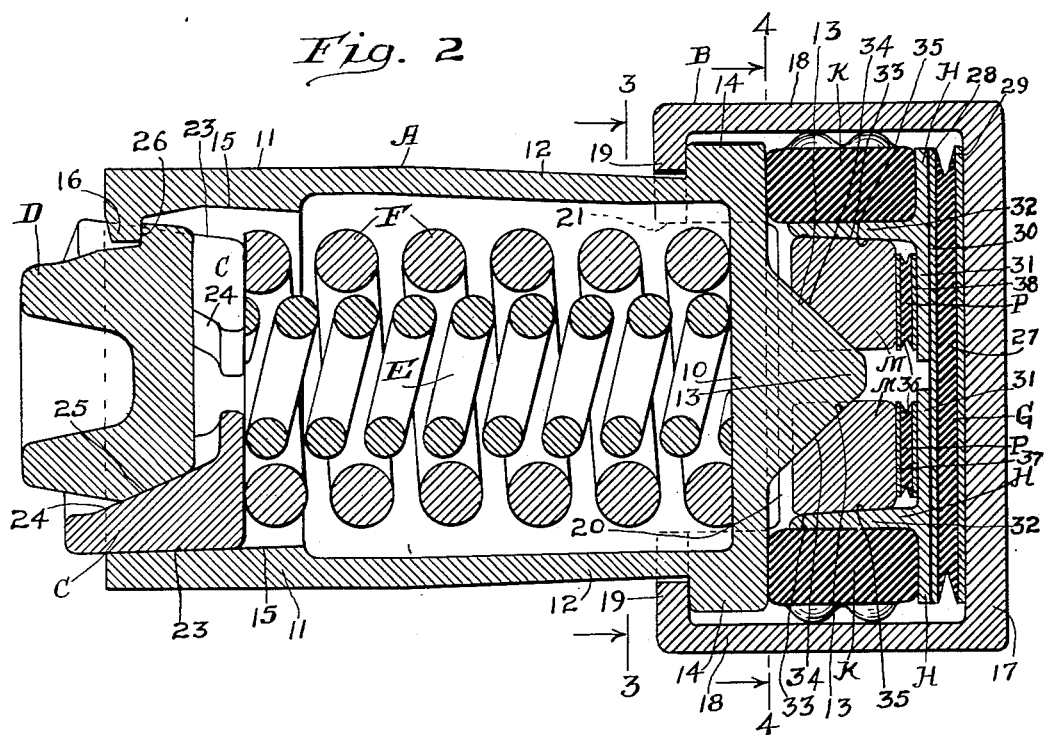
Inventor:
Harry W. Mulcahy.
By Henry Fuchs
Atty.

Aug. 23, 1955    H. W. MULCAHY    2,715,967
COMBINED FRICTION AND RUBBER SHOCK ABSORBING
MECHANISMS FOR RAILWAY DRAFT RIGGINGS
Filed Aug. 8, 1952    2 Sheets-Sheet 2
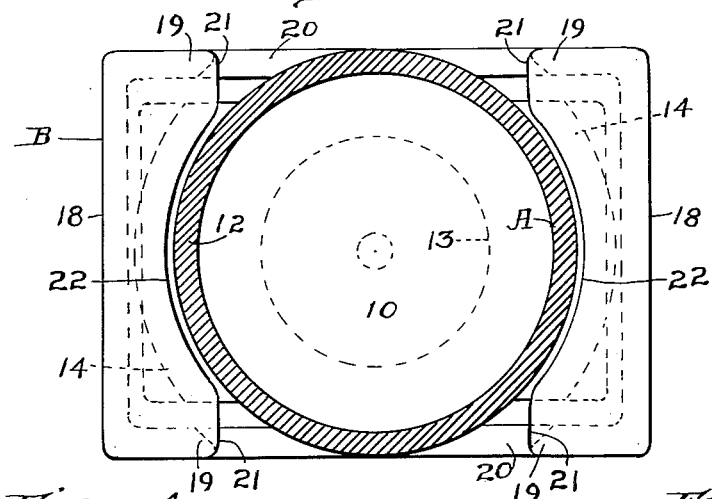
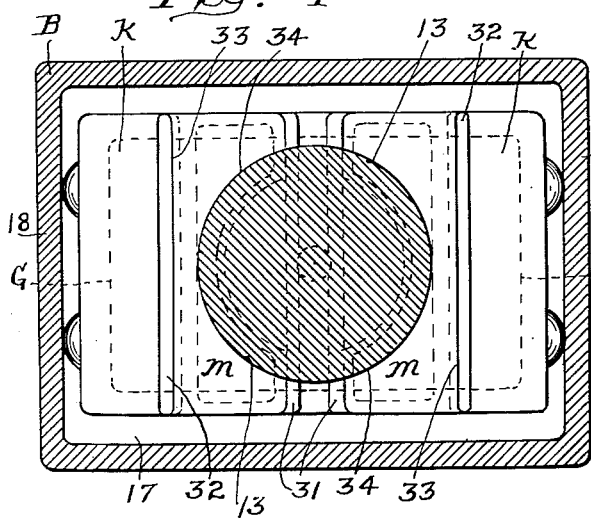
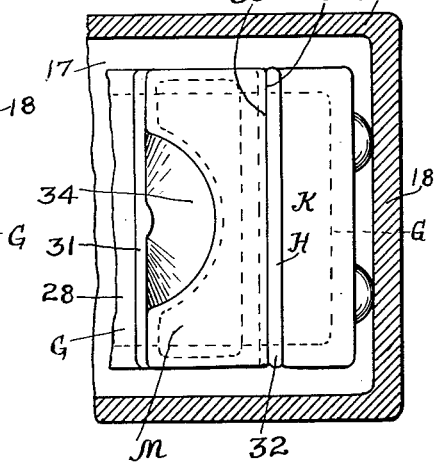
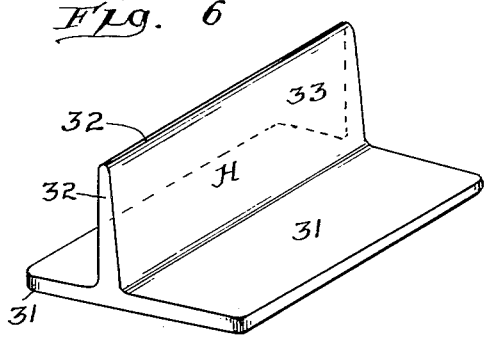
Inventor:
Harry W. Mulcahy.
By Henry Fuchs
Atty.

United States Patent Office 2,715,967
Patented Aug. 23, 1955

2,715,967

COMBINED FRICTION AND RUBBER SHOCK ABSORBING MECHANISMS FOR RAILWAY DRAFT RIGGINGS

Harry W. Mulcahy, Chicago, Ill., assignor to W. H. Miner, Inc., Chicago, Ill., a corporation of Delaware Application August 8, 1952, Serial No. 303,388

11 Claims. (Cl. 213—32)

This invention relates to improvements in high capacity, combined friction and rubber shock absorbing mechanisms for railway draft riggings.

One object of the invention is to provide a shock absorbing mechanism of the character indicated, comprising a friction casing, a friction clutch slidingly telescoped within one end of the casing, springs within the casing yieldingly opposing inward movement of the clutch, a rear follower cap at the other end of the casing, movable lengthwise with respect to the latter, a wedge projection on said last named end of the casing, a pair of friction blocks within said follower cap between which the wedge is engaged to spread the same apart and force them inwardly of the cap, a pair of laterally movable friction elements within said cap at opposite sides of the friction blocks and with which said blocks have engagement to spread said elements apart, rubber cushioning elements within said cap opposing lateral movement of said friction elements and inward movement of the casing, a transversely disposed cushioning unit including a rubber mat and a metal spacing plate within said cap, on which said friction elements bear and with the spacing plate on which the friction elements have sliding frictional engagement, and transversely disposed rubber pads interposed between the friction blocks and the friction elements and yieldingly opposing movement of said friction blocks inwardly of the cap.

A further object of the invention is to provide a mechanism as set forth in the preceding paragraph, wherein the friction elements are provided with lengthwise extending friction surfaces which converge inwardly of the cap and with which the blocks have sliding frictional engagement to add to the frictional capacity of the mechanism.

Other objects of the invention will more clearly appear from the description and claims hereinafter following.

In the accompanying drawings forming a part of this specification,

Figure 1 is a front elevational view of my improved mechanism.

Figure 2 is a horizontal, longitudinal sectional view, corresponding substantially to the line 2—2 of Figure 1.

Figures 3 and 4 are transverse sectional views, corresponding respectively to the lines 3—3 and 4—4 of Figure 2.

Figure 5 is a broken view, similar to Figure 4, showing the structure at the right hand side of said figure, with the wedge projection of the friction casing omitted.

Figure 6 is a detail perspective view of one of the friction elements of my improved mechanism.

My improved combined friction and rubber shock absorbing mechanism comprises broadly a friction casing A having a wedge projection, a rear follower cap B, a set of three friction shoes C—C—C slidable in the casing, a wedge block D in wedging engagement with the shoes C—C—C, inner and outer coil springs E and F within the casing A, yieldingly resisting inward movement of the shoes, a transversely disposed cushioning unit G including a transversely disposed spacing plate, a pair of friction elements H—H laterally slidable on said spacing plate, rubber cushioning elements K—K within said cap opposing inward movement of the casing A and yieldingly resisting lateral separation of said friction elements, a pair of friction blocks M—M in lengthwise sliding engagement with the friction elements H—H and in wedging engagement with the wedge projection of the casing A, and rubber pads P—P interposed between said friction blocks and rubber elements, yieldingly opposing inward movement of the friction blocks with respect to the friction elements.

The friction casing A is in the form of a hollow tubular member open at its front end and closed at its rear end by a transverse wall 10. The front end portion of the casing is of hexagonal transverse cross section and provides a friction shell portion 11. The portion of the casing rearwardly of the friction shell portion 11 is of cylindrical cross section and provides a spring cage member 12. At the rear end, the casing A is provided with a central wedge projection 13, which is of conical shape and extends from the wall 10. At opposite sides thereof, the rear end portion of the casing A is provided with laterally projecting, arcuate flanges 14—14 forming stops for the rear follower cap B. The hexagonal friction shell portion 11 of the casing A presents three interior, inwardly converging friction surfaces 15—15—15, which are of V-shaped transverse cross section. At the outer end, the friction shell portion of the casing is provided with three inturned stop lugs 16—16—16, which are alternated with the friction surfaces of the shell portion.

The rear follower cap B has a transverse vertical rear wall 17 from which extend forwardly projecting side walls or arms 18—18, overlapping the rear end of the casing A and provided with inturned flanges 19—19 at their front ends engaged in front of the flanges 14—14 of the casing. Top and bottom walls 20—20 connect the side walls 18—18 of the cap B and these walls are cut out, or recessed, at their front ends, as indicated at 21—21, to provide openings through which the flanged rear end portion of the casing may be entered in assembling the mechanism. As shown in Figure 1, the mid portion of the flanges 19—19 of the arms 18—18 are cut out, as indicated at 22—22, to fit the outside curvature of the spring cage member 12 of the casing A.

The friction shoes C, which are three in number, are telescoped within the casing A and are provided with longitudinally extending, V-shaped friction surfaces 23—23—23 in sliding engagement with the V-shaped friction surfaces 15—15—15 of the casing A. Each shoe C has a V-shaped wedge face 24 on its inner side.

The wedge block D has three V-shaped wedge faces 25—25—25 arranged symmetrically about the central longitudinal axis of the casting A and engaging, respectively, the wedge faces 24—24—24 of the shoes C—C—C. The wedge block D is further provided with three radially outwardly extending stop lugs 26—26—26, which extend between adjacent shoes and are engaged in back of the stop lugs 16—16—16 of the casing A to limit outward movement of the wedge block D and thus hold the parts of the friction shock absorbing mechanism assembled.

The springs E and F are disposed within the casing A, having their opposite ends bearing on the inner ends of the shoes C—C—C and the rear wall 10 of the casing A.

The cushioning unit G comprises a rubber mat 27 interposed between spacing plates 28 and 29. The spacing plates 28 and 29 are secured to the front and rear sides of the mat, respectively, being preferably vulcanized to said mat. The cushioning unit G is disposed within the follower cap B in abutting relation with the rear wall 17 of the latter. The spacing plate 28, which is at the front side of the unit, serves as a friction member and presents a transversely disposed flat friction surface 39.

The friction elements H—H are disposed at opposite sides of the mechanism within the follower cap B. Each friction element H comprises a flat platelike member 31 and a forwardly extending web at right angles to said platelike member, forming a vertical wall 32 projecting forwardly from the central portion of the plate member 31. The inner surface of the wall 32 presents a flat friction surface 33, slightly inclined to the central longitudinal axis of the mechanism. The opposed friction surfaces 33—33 of the friction elements H—H converge rearwardly of the mechanism.

The rubber cushioning elements K—K are arranged within the follower cap B at opposite sides of the mechanism, each element K being interposed between the wall 32 of the corresponding element H and the corresponding side wall 18 of the follower cap B, having its front and rear ends, respectively, abutting the rear wall 10 of the casing A and the plate member 31 of said friction element.

As will be evident, the rubber cushioning elements K—K yieldingly resist lateral separation of the friction elements H—H and inward movement of the casing A.

The friction blocks M—M are disposed within the follower cap B at opposite sides of the wedge projection 13 of the casing A. Each block M has a wedge face 34 on its inner side, which is of conical contour and is engaged by the corresponding side of the conical wedge projection 13 of the casing A. On the outer side, each block M presents a lengthwise extending friction surface 35, which has sliding engagement with the friction surface 33 of the corresponding friction elements H.

The rubber pads P—P are interposed between the platelike members 31—31 of the friction elements H—H and the friction blocks M—M. Each pad P comprises a rubber mat 36 and front and rear spacing plates 37 and 38. The plate 37 of each pad P abuts the rear end of the corresponding block M and the platelike member 31 of the friction element H at the corresponding side of the mechanism. In the assembled condition of the shock absorbing mechanism, the cushioning unit G, rubber cushioning elements K—K, and the rubber pads P—P are all under a predetermined amount of initial compression.

In assembling the mechanism, the rear follower cap B is placed on a suitable horizontal support with the rear side of the wall 17 resting on said support so that the side walls or arms 18—18 are in upstanding position. The entire assembling operation is preferably performed while the rear follower B is in this standing position. The cushioning unit G, the friction elements H—H, friction blocks M—M, the rubber cushioning elements K—K, and the pads P—P are placed within the follower cap B in the following order: The cushioning unit G is seated on the wall 17 of the follower cap B, the friction blocks M—M, with the cushioning elements K—K supported thereon, are then arranged at opposite sides of the follower cap B on the unit G, the pads P—P are next placed in position on the platelike members 31—31 of the friction elements H—H, and the friction blocks M—M seated on these pads. The casing A, in upright position, is then assembled with the follower cap B, the same being first turned so that the flanges 14—14 thereof register with the top and bottom openings between the opposed flanges 19—19 of the side walls 18—18 of the follower cap B, whereby the flanges 14—14 will pass freely between the flanges 19—19 and be positioned in back of the latter when the casing A is rotated through an angle of 90 degrees about its longitudinal axis. With the casing in this position, the same is forced downwardly, engaging the wedge projection 13 thereof between the friction blocks M—M. This downward forcing movement of the casing A is continued until the flanges 14—14 of the casing pass below the level of the flanges 19—19 of the follower cap B. After the flanges 14—14 have been brought below the level of the flanges 19—19 of the follower cap B, the casing A is rotated about its longitudinal axis to engage the flanges 14—14 in back of the flanges 19—19. After the casing A has thus been connected to the follower cap B, the inner and outer coil springs E and F, the shoes C—C—C, and the wedge block D are applied to the casing A, the lugs 26—26—26 of the wedge block D being engaged in back of the lugs 16—16—16 of the casing A while the shoes C—C—C are held in inwardly displaced position by any suitable tool engaged with said shoes to place the springs E and F under compression. Although this is the preferred assembling procedure, it will be evident that the springs E and F, shoes C—C—C, and wedge block D may be assembled with the casing A before the latter is applied to the follower cap B.

The operation of my improved shock absorbing mechanism is as follows: During relative movement of the front follower of the usual draft rigging of a railway car and the friction casing A toward each other, the wedge D is forced inwardly of the casing A, thereby wedging the shoes C—C—C apart and sliding the same inwardly on the friction surfaces of the casing, against the resistance of the springs E and F. During this action, the casing A is also forced rearwardly toward the follower cap B, due to frictional engagement of the shoes C—C—C with said casing, compressing the rubber cushioning elements K—K in lengthwise direction, wedging the friction blocks M—M apart and forcing the same rearwardly on the friction surfaces 33—33 of the friction elements H—H. At the same time, due to the spreading apart of the friction blocks M—M, the friction elements H—H are forced laterally outwardly, sliding on the friction surface 30 of the plate 28 of the cushioning unit G, compressing the rubber cushioning elements K—K against the side walls 18—18 of the follower cap B. During this action, the rubber pads P—P are compressed between the friction blocks M—M and the platelike members 31—31 of the friction elements H—H, and the rubber cushioning unit G is compressed between the rear wall 17 of the follower cap B and the friction elements H—H.

As will be evident, high shock absorbing capacity is thus provided by the combined action of the spring resisted friction shoes C—C—C, sliding on the friction surfaces of the casing A, the rubber cushioned friction blocks M—M sliding on the friction surfaces 33—33 of the friction elements H—H, and the rubber cushioned friction elements H—H sliding laterally on the friction surface of the plate 28 of the rubber cushioning unit G.

In release of the mechanism, when the actuating force is reduced, the expansive action of the springs E and F returns the shoes C—C—C and the wedge D to the normal full release position shown in Figure 2, and the rubber cushioning unit G, rubber elements K—K, and rubber pads P—P restore the casing A, friction elements H—H, and the friction blocks M—M to the normal full release position shown in Figure 2, the rubber elements K—K acting directly on the casing A to force the same outwardly and thus effect release between the wedge projection 13 of the casing and the friction blocks M—M.

I claim:

1. In a combined rubber and friction shock absorbing mechanism, the combination with a friction casing; of friction shoes slidingly telescoped within the casing; spring means within the casing yieldingly opposing inward movement of said shoes; a wedge block in wedging engagement with said shoes; a rear follower cap; a wedge member carried by the casing, said wedge extending rearwardly from said casing; a pair of blocks within said cap between which said wedge member engages to wedge said blocks laterally apart; and rubber cushioning means within said cap yieldingly opposing lateral separation of said blocks.

2. In a combined rubber and friction shock absorbing mechanism, the combination with a friction casing; of friction shoes slidingly telescoped within the casing; spring means within the casing yieldingly opposing inward movement of said shoes; a wedge block in wedging engagement with said shoes; a rear follower cap, said casing being movable lengthwise of the mechanism with respect to said cap; a wedge member carried by said casing for movement therewith; a pair of blocks within said cap between which said wedge member engages to wedge said blocks laterally apart; rubber cushioning means within said cap yieldingly opposing lateral separation of said blocks; and rubber cushioning means yieldingly opposing movement of said blocks inwardly of the follower cap.

3. In a combined rubber and friction shock absorbing mechanism, the combination with a friction casing; of friction shoes slidingly telescoped within the casing; spring means within the casing yieldingly opposing inward movement of said shoes; a wedge block in wedging engagement with said shoes; a rear follower cap, said casing being movable lengthwise of the mechanism with respect to said cap; an integral wedge projection on the rear end of said casing; a pair of blocks within said cap between which said projection engages to wedge said blocks laterally apart; and rubber cushioning means within said cap yieldingly opposing lateral separation of said blocks.

4. In a combined rubber and friction shock absorbing mechanism, the combination with a friction casing; of friction shoes slidingly telescoped within the casing; spring means within the casing yieldingly opposing inward movement of said shoes; a wedge block in wedging engagement with said shoes; a rear follower cap, said casing being movable lengthwise of the mechanism with respect to said cap; a wedge member movable lengthwise of the mechanism in unison with said casing; a pair of laterally outwardly movable friction elements within said cap; means within the cap presenting a transverse friction surface on which said elements are laterally slidable, said wedge member being engaged between said elements to wedge the same laterally apart; and rubber cushioning means within said cap yieldingly opposing lateral separation of said elements.

5. In a combined rubber and friction shock absorbing mechanism, the combination with a friction casing; of friction shoes slidingly telescoped within the casing; spring means within the casing yieldingly opposing inward movement of said shoes; a wedge block in wedging engagement with said shoes; a rear follower cap, said casing being movable lengthwise of the mechanism with respect to said cap; a wedge member movable lengthwise of the mechanism in unison with said casing; a pair of laterally outwardly movable friction elements within said cap; a transversely disposed rubber cushioned friction member within said cap presenting a transverse friction surface on which said elements are laterally slidable, said wedge member being engageable between said elements to wedge the same laterally apart; and rubber cushioning means within said cap yieldingly opposing lateral separation of said elements.

6. In a combined rubber and friction shock absorbing mechanism, the combination with a friction casing; of friction shoes slidingly telescoped within the casing; spring means within the casing yieldingly opposing inward movement of said shoes; a wedge block in wedging engagement with said shoes; a rear follower cap, said casing being movable lengthwise of the mechanism with respect to said cap; a wedge member movable lengthwise of the mechanism in unison with said casing; a pair of friction elements within said cap at opposite sides of the mechanism having opposed, lengthwise extending friction surfaces; rubber cushioning members within said cap yieldingly opposing lateral separation of said friction elements; friction blocks at opposite sides of the mechanism slidable lengthwise on the friction surfaces of said friction elements; and rubber cushioning means yieldingly opposing movement of said friction blocks inwardly of said cap.

7. In a combined rubber and friction shock absorbing mechanism, the combination with a friction casing; of friction shoes slidingly telescoped within the casing; spring means within the casing yieldingly opposing inward movement of said shoes; a wedge block in wedging engagement with said shoes; a rear follower cap, said casing being movable lengthwise of the mechanism with respect to said cap; a wedge member movable lengthwise of the mechanism in unison with said casing; a pair of laterally outwardly movable friction elements within said cap; means within the cap presenting a transverse friction surface on which said elements are laterally slidable, said elements having lengthwise extending opposed friction surfaces thereon; friction blocks at opposite sides of the mechanism slidable on said lengthwise extending friction surfaces, said wedge member being engaged between said friction blocks to wedge the same laterally apart; rubber cushioning means within said cap yieldingly opposing lateral separation of said friction elements; and additional rubber cushioning means within said cap yieldingly resisting lengthwise movement of said friction blocks inwardly of said cap.

8. In a combined rubber and friction shock absorbing mechanism, the combination with a friction casing; of friction shoes slidingly telescoped within the casing; spring means within the casing yieldingly opposing inward movement of said shoes; a wedge block in wedging engagement with said shoes; a rear follower cap, said casing being movable lengthwise of the mechanism with respect to said cap; a wedge member movable lengthwise of the mechanism in unison with said casing; a pair of laterally outwardly movable friction elements within said cap; a transversely disposed rubber cushioned friction member within said cap presenting a transverse friction surface on which said elements are laterally slidable, said elements having lengthwise extending opposed friction surfaces thereon; a pair of friction blocks having lengthwise extending friction surfaces engaging said opposed friction surfaces, said wedge member being engaged between said friction blocks to wedge the same laterally apart; rubber cushioning means within said cap opposing lateral separation of said elements; and additional rubber cushioning means opposing movement of said friction blocks inwardly of the cap.

9. In a combined rubber and friction shock absorbing mechanism, the combination with a friction casing; of friction shoes slidingly telescoped within the casing; spring means within the casing yieldingly opposing inward movement of said shoes; a wedge block in wedging engagement with said shoes; a rear follower cap, said casing being movable lengthwise of the mechanism with respect to said cap; a wedge member movable lengthwise of the mechanism in unison with said casing; a pair of friction elements at opposite sides of the mechanism within said cap having opposed lengthwise extending friction surfaces; rubber cushioning means within said cap yieldingly opposing lateral separation of said friction elements; friction blocks at opposite sides of the mechanism slidable lengthwise on the friction surfaces of said friction elements, said wedge member being engaged between said blocks; a transversely disposed rubber cushioned friction member within said cap presenting a transverse friction surface on which said elements are laterally slidable, said elements having transverse abutments rearwardly of said friction blocks; and rubber cushioning members interposed between the rear ends of said friction blocks and said abutments of said elements.

10. In a shock absorbing mechanism, the combination with a member open at its front end and having a transverse rear wall; of a transversely disposed friction member within said housing; yielding cushioning means interposed between said friction member and the rear wall of said first named member; a pair of friction elements within said first named member at opposite sides of the mechanism, said elements being laterally slidable on said friction member; a wedge member at the open end of said first named member movable lengthwise with respect to the same and engaged between said friction elements to wedge the same laterally apart; and yielding means within said first named member opposing lateral separation of said friction elements.

11. In a shock absorbing mechanism, the combination with a member open at its front end and having a transverse rear wall; of a transversely disposed friction plate in said member; yielding means interposed between and bearing on said friction plate and the rear wall of said member; a pair of friction elements within said member laterally slidable on said friction plate, said elements having opposed, lengthwise extending friction surfaces and transverse abutment faces thereon; friction blocks having lengthwise extending friction surfaces engaging with said friction surfaces of said elements; cushioning means interposed between and bearing on the rear ends of said blocks and said transverse abutment faces of said elements; a wedge member at the open end of said first named member movable lengthwise with respect to the same and engaged between said blocks to wedge the same laterally apart; and yielding means within said first named member at opposite sides thereof opposing lateral separation of said friction elements.

No references cited.